United States Patent Office 3,706,545
Patented Dec. 19, 1972

3,706,545
FOLIAR SPRAYS
Kenneth Russell Gray, Lloyd Eugene Van Blaricom, Franklin Willard Herrick, and Harvey Rudolph Deweyert, Shelton, Wash., assignors to International Telephone and Telegraph Corporation, New York, N.Y.
No Drawing. Continuation of application Ser. No. 818,823, Apr. 23, 1969. This application Aug. 27, 1970, Ser. No. 67,598
Int. Cl. C05f 11/00
U.S. Cl. 71—1                         37 Claims

ABSTRACT OF THE DISCLOSURE

Foliar sprays are provided for overcoming iron deficiency in iron chlorotic tropical and sub-tropical evergreen trees. The sprays comprise non-toxic, water soluble polyols, ethers of these polyols and mixtures thereof in conjunction with organic iron sources.

---

This application is a continuation of our copending application, Ser. No. 818,823, filed Apr. 23, 1969, and now abandoned.

This invention relates to new and improved foliar sprays. More particularly, it relates to new and improved penetrant iron sprays for controlling iron chlorosis and to methods for controlling iron chlorosis employing these sprays.

It has been a continuing problem in the agricultural industry to provide an effective means for combatting chlorosis in fruit trees growing in iron-deficient soils. This problem is of major consequence to fruit growers since iron chlorosis in fruit trees causes progressively substandard yields of fruit and, in some cases, poorer quality fruit. This reduction in yield and lowered quality product is a substantial economic disadvantage. The heretofore available methods and products which have been proposed for treatment of iron chlorosis, particularly in citrus trees, have not solved this problem.

Soil treatment techniques employing iron complexes and iron-chelates have been found to be either ineffective or extremely costly for control of iron chlorosis in fruit trees growing in calcareous (alkaline) soils. Such soil application techniques are known to control chlorosis of shallow-rooted field or vegetable crops. However, these techniques are not effective for fruit trees which usually have main root systems at considerably deeper levels. Also, in most areas of the world, fruit trees are grown in soils containing a substantial percentage of clay. Consequently, if the iron complexes or iron chelates are applied with water to the surface of such soils around the base of fruit trees, they are absorbed by the clay in the upper soil levels and do not effectively reach the root zone.

Another reason for the general ineffectiveness of soil application treatments for fruit trees is that orchards are frequently planted on slopes. In such cases, underground flows of water tend to wash-out the iron complexes or chelates which are permeating downward from the soil surface before they can reach the root zones of the trees.

Consequently, spraying techniques have been adopted in an attempt to control iron chlorosis of fruit trees. Since fruit trees are routinely sprayed with insecticides and fungicides, it is generally convenient to spray such trees with an iron source to correct the iron deficiency. These spray treatments with various iron sources have achieved varying degrees of success in combatting iron chlorosis. For example, iron chlorosis in certain species of deciduous fruit trees can be readily corrected by spraying the foliage with a solution of a ferrous complex of a sulfonated, polymeric flavonoid from conifer bark as described in U.S. Pat. No. 3,270,003. Also, a ferric chelate of ethylenediaminetetracetic acid has been used in an attempt to correct chlorosis of deciduous fruit trees by foliar spray application. However, this particular procedure has not proved to be acceptable since the tendency of this ferric chelate to burn the foliage and the fruit prevents the application of an effective amount of iron to the leaves. Sprays including ferrous and ferric salts and complexes of hydroxy acids have also been tested for the purpose of correcting iron chlorosis. These compositions have the advantages of giving very light colored sprays with very little staining properties and of having low toxicity to leaves of deciduous fruit trees. However, these iron-derivative foliar sprays have not been effective in controlling chlorosis in iron chlorotic, tropical and sub-tropical evergreen fruit trees.

In the case of chlorotic, tropical and sub-tropical evergreen fruit trees, the problem of combatting iron chlorosis is extremely difficult. No effective, economically advantageous means for surmounting the iron deficiency problem with regard to these trees growing in calcareous soil has been found heretofore. In these fruit trees, the outer walls of the epidermal cells of the leaves are covered (especially on the upper surface) by thick cuticles interspersed and superimposed by waxes. Such waxy cuticles serve the function of preventing excess evaporation of water from the leaves of these trees growing in hot, arid climates. However, the waxy cuticles act as effective bars to penetration of hydrophilic substances such as iron sprays. Because of this difficulty in penetrating the waxy surfaces of the leaves of these evergreen fruit trees by iron sprays, there has not been, heretofore, any satisfactory commercially acceptable spray process for correction of this chlorosis.

Exemplary of sub-tropical evergreen fruit trees are orange, lemon, and other citrus trees, and avocado trees of the Mexican and Guatemalan races and the like. Typical examples of tropical evergreen fruit trees are the coffee bean trees and avocado trees of the West Indies race.

It would, therefore, be highly desirable and economically advantageous to develop a new and improved penetrant iron spray for controlling iron chlorosis in tropical and sub-tropical evergreen fruit trees. Additionally, it would be of great value to develop new and improved methods for controlling iron chlorosis in these fruit trees.

It is therefore an object of the present invention to provide new and improved foliar sprays for the control of iron chlorosis in fruit trees.

Another object is to provide foliar iron sprays which effectively penetrate the waxy cuticle on tropical and sub-tropical evergreen fruit tree leaves in order to combat iron chlorosis in these trees.

A further object is to provide penetrant iron sprays which promote the translocation of iron throughout the leaves in chlorotic fruit trees, thereby improving the quality of the fruit yielded by these trees.

Still another object is to provide substantially colorless foliar sprays for the control of iron chlorosis which are relatively non-staining.

Yet another object is to provide foliar, penetrant iron sprays for the control of iron chlorosis which have a low degree of toxicity to the plants and foliage.

A still further object is to provide an effective and economically advantageous method for controlling iron chlorosis in tropical and sub-tropical evergreen fruit trees employing new and improved foliar iron sprays.

Additional objects if not specifically set forth herein will be readily apparent to those skilled in the art from the following detailed description of the invention.

Generally, the foliar sprays of the present invention include non-toxic, water soluble compounds such as polyols, ethers of these polyols and mixtures thereof in conjunction with organic iron sources. These sprays have been found to be highly effective in application to the leaves of such sub-tropical evergreen trees as orange, lemon, and other citrus fruit trees, avocado trees of the Mexican and Guatemalan races and the like to prevent iron chlorosis. The instant sprays have also been found to be very effective in treating iron chlorotic tropical evergreen fruit trees such as coffee bean trees, avocado trees of the West Indies race and the like to overcome iron deficiency.

It has been discovered that when the compositions of this invention are employed in a method comprising spraying an aqueous solution of these compositions on an iron chlorotic tropical or sub-tropical fruit tree, these foliar sprays will penetrate through the waxy cuticles of the chlorotic leaves allowing the iron in the spray to permeate throughout the iron deficient area of the leaves, thus resulting in effective control of the iron deficiency.

In addition to effecting penetration of the leaves, it has been found that these spray compositions also promote, to some extent, translocation of iron within the leaves. In this capacity, these iron sprays cause more even and complete greening of the leaves. As a consequence of this greening, the property of the leaves to produce sugars is enhanced and thus the quality of fruit obtained is improved.

More specifically, the instant spray compositions comprise aqueous solutions of penetrant compounds including aliphatic polyhydric alcohols, low alkyl ethers of said polyhydric alcohols and mixtures thereof, and water soluble organic sources of plant-available iron. In addition, conventional spreaders and/or stickers or other additives may be included in the compositions as desired.

The penetrant compounds to be employed in the instant compositions are water miscible, aliphatic polyols or polyhydric alcohols containing from 2 to 28 carbon atoms and low alkyl ethers of these polyols wherein the alkyl group has 1 to 4 carbon atoms and mixtures thereof. In a preferred embodiment of this invention, the polyols and ethers thereof should resist crystallization upon evaporation from water solutions, e.g., when the foliar spray evaporates on the surface of a leaf.

As used herein, the terms polyols and polyhydric alcohols are not restricted to compounds containing only a multiplicity of hydroxyl groups as the functional groups. This term is also intended to cover other aliphatic polyhydroxy compounds which do not contain acid groups such as carboxyl groups.

Effective polyols to be employed herein include glycerol, ethylene glycol, propylene glycol, dipropylene glycol, triethylene glycol, sorbitol, pentaerythritol, $\alpha$-methyl-D-glucoside, 1,3 butanediol, mannitol, $\alpha$-methyl-D-mannoside, polypropylene glycol with an average molecular weight of about 425, polyethylene glycols (also termed polyethylene oxides) with up to 28 carbon atoms (e.g., Carbowax 200 with average M.W. of 200 and Carbowax 600 with average M.W. of 600), and the like.

Effective ethers of polyols for the purposes of this invention include the monomethyl, monoethyl, monobutyl and diethyl ethers of ethylene glycol, dimethyl ethers of di- or tri- or polyethylene glycols (known also as diglyme, triglyme and polyglymes), the monomethyl, diethyl, and monobutyl ethers of diethylene glycol and the like.

It is also possible to employ as the polyol component of the instant foliar sprays, various mixed sugars which resist crystallization on drying from solutions. Exemplary of mixed sugars which may be employed are corn syrup, partly inverted refiners sugar, syrup comprising mixtures of corn syrup and sucrose and mixtures of sucrose and glucose. Where mixed sugars in syrup form are used in this invention, the polyol content is considered to be solids content of the syrup.

Effective plant-available organic iron sources which may be used in conjunction with the polyols and polyol ethers in preparing the foliar sprays of this invention include ferrous complexes of sulfonated polymeric flavonoids (particularly those derived from conifer and hardwood barks and quebracho wood), ferrous complexes of sulfomethylated polymeric flavonoids derived from conifer barks, iron complexes of potassium and sodium plicatates, ferrous and ferric salts of hydroxy acids, ferrous complexes of hydroxy acid salts, ferric complexes of alpha amino acids derived from polyamines of the group comprising ethylenediaminetetraacetic acid, diethylenetriaminepentaacetic acid and ethylenediamine di(o-hydroxyphenylacetic acid) and mixtures thereof.

The nature of sulfonated polymeric flavonoids from conifer barks and quebracho wood extract and methods of preparation and complexing thereof with ferrous salts are described in U.S. Pat. No. 3,270,003. A ferrous rather than a ferric salt is preferably employed for the complexing of these compositions since reducing components in the sulfonated extracts reduce ferric to ferrous ion. In general, the sulfonated polymeric flavonoids derived from conifer bark or sulfonated quebracho wood extract is complexed with ferrous salt equivalent to about 4.5 to 20% iron (based on extract solids) yielding complexed products with from about 4 to 13% iron content. Particularly effective products are prepared by extracting hemlock or southern pine barks with a mixture of sodium bisulfite and sulfite and complexing the extract with ferrous sulfate equivalent to about 16% iron (based on extract solids) giving complexes with iron content of about 11%.

Sulfonated quebracho wood extract used for the preparation of the iron complexes may be prepared by digesting comminuted quebracho wood at elevated temperature with aqueous solutions of sodium sulfite or bisulfite, potassium sulfite or bisulfite and/or mixtures of the same followed by extraction as described in U.S. Pat. No. 3,270,003. Alternatively, commercial ordinary quebracho (dried water extract) may be dissolved in water and reacted at elevated temperature with the same reactants. With either method, the preferred product will have higher sulfonate contents (e.g., at least 2.5% calculated as elemental sulfur) than the usual clarified (sulfonated) quebracho extracts used for tanning which generally have low sulfonate contents (e.g., equivalent to from about 0.3 to 1.5% calculated as elemental sulfur).

The ferrous complexes of sulfomethylated polymeric flavonoids derived from conifer barks are prepared by digesting conifer barks with formaldehyde, sodium bisulfite or mixtures of sodium bisulfite, equivalent to about 5 to 15% sulfur dioxide (based on bark), and 1 mole of formaldehyde per mole of sulfur dioxide. After digestion at temperatures of between about 100°–170° C. the extract is separated from the bark and concentrated in an evaporator. The concentrated extract is complexed with ferrous salt equivalent to about 4 to 20% iron (based on the extract solids). A particularly effective product is prepared from hemlock bark using the formaldehyde addition product of a sodium bisulfite-sulfite mixture equivalent to about 7% sulfur dioxide (based on bark) digested at 170° C. After concentration, the bark extract is complexed with ferrous sulfate equivalent to 16% iron based on extract solids.

Particularly effective ferrous and ferric salts of hydroxy acids and ferrous complexes of hydroxy acid salts for use in the penetrant sprays of this invention are ferrous and ferric salts of and ferrous complexes of sodium, potassium, ammonium, and sodium-potassium salts of the following hydroxy acids: gluconic acid, glucoheptonic acid, mixed gulonic and idonic acids (mixture of isomeric hexonic acids resulting in the sodium salt form from the reaction of sodium cyanide with xylose), gluco-saccharic acid, tartaric acid, citric acid, mannoheptonic acids, isosaccharinic and saccharinic acids.

By the term "ferrous complex" as used herein with reference to a hydroxy acid salt is meant the resulting composition when an inorganic ferrous salt such as ferrous sulfate is added to a hydroxy acid salt in solution (irrespective of the degree to which a complex is actually formed). In general, the complexes are formed by addition of a ferrous salt such as ferrous sulfate in an amount equivalent to about 0.3 to 1.3 moles of iron per mole of carboxyl in the hydroxy acid salt. In a preferred embodiment, ferrous sulfate equivalent to about 0.4 to 1.00 mole iron per mole of carboxyl is employed for the complexing.

By the term "ferrous and ferric salt of hydroxy acids" as employed herein is meant compounds having the composition of such salts when used for formulation (irrespective of the degree to which such compounds may exist as complexes or the degree to which the hydroxy acid anions may convert to lactones).

In the penetrant foliar spray compositions of the invention, the polyols and ethers thereof to be used with the iron sources should be present at concentrations of from about 0.3% to about 8% based on the weight of the spray solution. The iron sources used in conjunction therewith, should be employed in amounts sufficient to provide concentrations of about 0.5 to about 6.0 pounds of iron per 100 gallons of spray solution. In a preferred embodiment, the iron sources should be present in amounts to give concentrations of from about 1.0 to about 3.0 pounds of iron per 100 gallons.

In these penetrant foliar sprays it is often advantageous to incorporate low-biuret urea into the sprays. It is believed that urea does not have a direct effect on correcting the chlorosis but serves to provide additional nitrogen to the cells while they are synthesizing chlorophyl as a result of foliar application of iron. Inclusion of urea tends to permit use of lower quantities of the polyol or ethers thereof without loss of effectiveness. Suitable concentrations of urea to be included in these sprays have been found to be from about 2.5 to 10 pounds per 100 gallons of spray with a preferred range of about 5 to 7.5 pounds per 100 gallons.

As with other types of fruit tree sprays, it may be desirable to add a small amount of a spreader in order to achieve satisfactory distribution of spray on the leaves. In order to avoid possible damage to fruit by use of excess spreader, only enough spreader should be employed to achieve satisfactory spray distribution. A suitable spreader for use in the penetrant sprays of this invention is sodium dioctyl sulfosuccinate commercially available under the trade name Vatsol OT or Aerosol OT. In the case of penetrant sprays for relatively slick citrus foliage, a suitable concentration of the sodium dioctyl sulfosuccinate is 0.04% (solids basis) based on the weight of the spray solution.

In order to minimize the possibility of the penetrant spray ingredients being prematurely washed off the leaves by rain or by subsequent application of pesticidal sprays, a commercial sticker may be added to the sprays of this invention. A concentration of about 0.08% of such sticker on an "as is" basis has been found to be very suitable for this purpose.

All of the above mentioned concentrations and concentration ranges for equivalents of these penetrant sprays have been the concentrations suitable for use in spraying. In actual practice, these sprays are usually formulated initially as liquid concentrates. To prepare these liquid concentrates, the iron sources can be used in a 40 to 50% aqueous solution. To this solution, quantities of the penetrant agent such as the polyols, the ethers, of these polyols and mixtures thereof are added. Additives such as spreaders, stickers, urea and the like may also be added if desired. When the spray is diluted to a suitable iron concentration for spraying, the other ingredients are also present at the desired concentrations as specified heretofore. The spreader, sticker and urea can be omitted and such products added to the diluted spray at the discretion of the users.

The following examples are set forth for the purpose of illustration only and are not intended to be construed as being limitative in any respect.

EXAMPLE I

A supply of Western hemlock bark was ground in a hammer hog and subsequently fed to an inclined vibrating screen provided with holes 1½ inches in diameter. Bark passing through this screen was fed to a continuous horizontal digester wherein it was diluted to 20% consistency. The diluted bark was then reacted with a

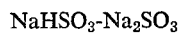

$NaHSO_3$-$Na_2SO_3$ solution for 30 minutes at a maximum temperature of 338° F. The composition of the $NaHSO_3$-$Na_2SO_3$ solution was such that 75% of the total $SO_2$ was present as $NaHSO_3$ and 25% as $Na_2SO_3$. The quantity of this solution used was such as to provide 7.0 parts $SO_2$ per 100 parts oven dry bark. Following digestion, liquor containing the sulfonated bark extract was separated in a clarified condition, from the non-solubilized portion of the bark by filtration on a belt filter. The non-solubilized portion of the bark was then compacted in a screw press to extract residual extract liquor and re-filtered. The filtrates were combined and the resulting clarified, sulfonated extract liquor was fed to a double-effect evaporator wherein it was concentrated at 130–300° F. to a solids concentration of 45%. After the concentrated extract liquor had been neutralized to pH 6.8 with $NH_4OH$ solution and heated to 180° F., an amount of $FeSO_4 \cdot 7H_2O$ equivalent to 16 parts iron per 100 parts extract solids was added to the hot liquor over a period of 1.5 hours. A subsequent mixing period of one hour was provided to insure that the $FeSO_4 \cdot 7H_2O$ dissolved in the extract liquor. The resulting liquor was then dried in a spray dryer to which 600° F. air was admitted. The iron-complexed, spray dried product was designated, for reference purposes, "Iron Source A."

EXAMPLE II

Valencia orange seedlings after germination in a mixture of peat moss and sand were planted in 8-inch planter pots containing approximately 2 kilograms of calcareous soil. A 1 gm. sample of calcium nitrate dissolved in 400 ml. of deionized water was added initially to each container. The orange seedlings were then grown in a controlled environment chamber using a repeating cycle of 14 hours illumination at about 1500 foot candles at 85° F. followed by 10 hours of darkness at 65° F. Eventually iron chlorotic small orange trees, suitable for experiments, were obtained.

EXAMPLE III

Three separate aqueous spray solutions were prepared. One solution, hereinafter termed Solution A, contained Iron Source A (prepared as described in Example I, in an amount of 10 pounds per 100 gallons of spray solution (equivalent to 1.06 pounds of iron per 100 gallons of spray solution), and 0.01% (based on the weight of the solution) of a commercial spreader ("Aerosol OT"). The second solution, hereinafter termed Solution B, was the same as the first except that 2% (based on the weight of the solution) glycerol was added to the spray solution. The third solution, hereinafter termed Solution C, was the same as the second solution but included in addition, 5 pounds of urea per 100 gallons of solution.

Each of the above solutions was sprayed on separate, individual leaves of a small orange tree (grown by the procedure of Example II) suffering from iron chlorosis. The tree was then grown in a controlled environment chamber (described in Example II) for two weeks. The leaves were then resprayed and grown for another two weeks in the controlled environment chamber. After this growth period, the sprayed leaves were removed from the tree, washed and observations were made. The leaves which initially displayed the yellow color characteristic of an iron deficiency condition (i.e., iron chlorosis) sprayed with only Solution A, which contained no polyol, exhibited only a very slight greening effect. On the other hand, the iron chlorotic, yellow colored leaves sprayed with Solutions B and C respectively, which each contained Iron Source A and 2% polyol (i.e., glycerol) exhibited very substantial greening.

EXAMPLE IV

A series of aqueous spray solutions was prepared. Each of the spray solutions contained a separate iron source in an amount of 10 pounds iron source per 100 gallons of solution and 0.01% (based on the weight of the solution) commercial spreader ("Aerosol OT"). The iron sources employed and the respective iron concentrations of each of the iron sources present in each of the sprays (expressed in pounds of iron per 100 gallons of solution) were: (1) ferrous gluconate—1.16, (2) ferrous glucoheptonate—0.98, (3) ferrous complex of sodium citrate—1.28, (4) ferrous complex of Rochelle salts (potassium-sodium tartrate)—1.14, and (5) ferrous mannoheptonate—0.84.

Another series of spray solutions was prepared which corresponded exactly to each of the above series of spray solutions except that 2% glycerol (based on the weight of the solution) was added to each of the solutions.

Each of the above solutions was sprayed on separate, individual leaves of a small Valencia orange tree (grown by the procedure of Example II) suffering from iron chlorosis and exhibiting the characteristic yellow color indicative of iron deficiency. The tree was then grown in a controlled environment chamber (described in Example II) for two weeks. The leaves were then resprayed and grown for another two weeks in the controlled environment chamber. After this growth period, the treated leaves were removed from the tree, washed and observations were made. The leaves which were sprayed with the solutions containing only the various iron sources and spreader, exhibited very slight, if any, correction of iron chlorisis. The leaves which were sprayed with solutions containing, in addition to the various iron sources and the spreader, 2% glycerol exhibited substantial correction of the chlorosis.

EXAMPLE V

A series of spray solutions was prepared containing Iron Source A at iron concentrations of 0.53, 1.06, 2.12 and 4.24 pounds of iron per 100 gallons of solution, respectively. Each of the solutions also contained 2% glycerol (based on the weight of the solution), 0.04% (based on the weight of the solution) commercial spreader ("Aerosol OT") and 0.08% (based on the weight of the solution) commercial sticker ("Plyac").

Another series of spray solutions was prepared which corresponded exactly to the first series of spray solutions except that 2% propylene glycol (based on the weight of the solution) was substituted for the 2% glycerol.

Each of the above solutions was sprayed on separate, individual iron chlorotic leaves of a chlorotic Valencia orange tree growing in California calcareous soil. The tree was then grown in a controlled environment chamber (described in Example II) for two weeks. The tree was then resprayed and grown for another two weeks in the controlled environment chamber. After this growth period, the sprayed leaves were removed from the tree, washed and observed. Very excellent correction of iron chlorosis was exhibited by the leaves over the complete range of iron applications (0.53–4.24 pounds of iron per 100 gallons of solution).

EXAMPLE VI

A series of spray solutions was prepared containing a ferrous complex of sodium glucoheptonate at iron concentrations of 0.53, 1.06, 2.12, and 4.24 pounds of iron per 100 gallons of solution, respectively. Each of the solutions also contained 2% glycerol (based on the weight of the solution), 0.04% (based on the weight of the solution) commercial spreader ("Aerosol OT") and 0.08% (based on the weight of the solution) commercial sticker ("Plyac").

Another series of spray solutions was prepared which corresponded exactly to the first series of spray solutions except that 2% propylene glycol (based on the weight of the solution) was substituted for the 2% glycerol.

Each of the above solutions was sprayed on separate, individual iron chlorotic leaves of a chlorotic Valencia orange tree growing in California calcareous soil. The tree was then grown in a controlled environment chamber (described in Example II) for two weeks. The tree was then resprayed and grown for another two weeks in the controlled environment chamber. After this growth period, the sprayed leaves were removed from the tree, washed and observed. Very excellent correction of iron chlorosis was exhibited by the leaves over the complete range of iron applications (0.53–4.24 pounds of iron per 100 gallons of solution).

EXAMPLE VII

Iron chlorotic orange tree leaves were sprayed with solutions containing the following proportion of ingredients:

| Ingredient | Amount |
|---|---|
| Iron source | 2.12 lb. iron per 100 gallons solution. |
| Propylene glycol | 2% (based on weight of solution). |
| Commercial spreader ("Aerosol OT") | .04% (based on weight of solution). |
| Commercial sticker ("Plyac") | .08% (based on weight of solution). |

A separate iron source was employed for each spray solution. The iron sources were (a) ferrous gluconate, (b) ferric citrate, (c) ferrous glucoheptonate, (d) ferrous saccharate and (e) the ferrous complex of sodium glucoheptonate, respectively. Each chlorotic leaf was sprayed with a separate solution. The tree was then grown in a controlled environment chamber (described in Example II) for two weeks. The tree was then resprayed and grown for another two weeks in the controlled environment chamber. After this growth period, the sprayed leaves were removed from the tree, washed and observations were made. Correction of iron chlorosis was obtained with each of the spray solutions.

EXAMPLE VIII

A series of aqueous spray solutions was prepared containing Iron Source A in an amount of 10 lb. iron source per 100 gllons of solution (equivalent to 1.06 lb. iron per 100 gallons of solution); 0.04 % (based on weight of solution) commercial spreader ("Aerosol OT"); 0.08% (based on weight of solution) commercial sticker ("Plyac"); and 0.0, 0.5, 1.0, 2.0, 4.0, and 8.0% (based on weight of solution) propylene glycol, respectively.

Another series of spray solutions was prepared corresponding exactly to the first series except that Iron Source A was employed in an amount of 15.7 lb. iron source per 100 gallons of solution (equivalent to 1.67 lb. iron per 100 gallons of solution).

Each of the above solutions was sprayed on separate, individual iron chlorotic leaves of a chlorotic orange tree. The tree was then grown in a controlled environment chamber (described in Example II) for two weeks. The tree was then resprayed and grown for another two weeks in the controlled environment chamber. After this second growth period, the sprayed leaves were removed from the tree, washed and observed. The results were tabulated in the following table:

| Amount iron per 100 gallons of solution | Amount propylene glycol (percent by weight) | Chlorosis correction |
| --- | --- | --- |
| 1.06 | [1] 0.0 | Very slight. |
| 1.06 | 0.5 | Good. |
| 1.06 | 1.0 | Very good. |
| 1.06 | 2.0 | Do. |
| 1.06 | 4.0 | Do. |
| 1.06 | 8.0 | Do. |
| 1.67 | [1] 0.0 | Very slight. |
| 1.67 | 0.5 | Good. |
| 1.67 | 1.0 | Very good. |
| 1.67 | 2.0 | Excellent. |
| 1.67 | 4.0 | Do. |
| 1.67 | 8.0 | Do. |

[1] Control.

It is to be noted from the above tabulation that only very slight correction of chlorosis was obtained when no propylene glycol was employed. On the other hand, when propylene glycol, in varying amounts was present in conjunction with the organic iron source, the resulting chlorosis correction ranged from good to excellent.

EXAMPLE IX

A series of spray solutions was prepared containing Iron Source A equivalent to 1.06 lb. iron per 100 gallons of solution, 0.04% (based on the weight of the solution) commercial spreader ("Vatsol OT"), 0.08% (based on the weight of the solution) commerical sticker ("Plyac") and 2% (based on the weight of the solution) water soluble polyol or alkyl ether of a polyol as tabulated below. Chlorotic leaves of small Valencia orange trees growing in California calcareous soil were sprayed on both sides with separate solutions from the series of penetrant iron sprays which were prepared. The small trees were then grown in a controlled environment chamber (described in Example II) for two weeks and in some cases the trees were resprayed. The trees were grown for another two weeks in the controlled environment chamber. After this four week growth period, the treated leaves were removed from the trees, washed and observations were made.

The following table sets forth the polyols and polyol ethers employed in the spray solutions, the number of spray treatments applied and the resulting chlorosis correction obtained by the foliar application of the various sprays.

| Polyol or polyol ether used | Number of spray applications | Iron chlorosis correction |
| --- | --- | --- |
| Control (none) | 2 | Very slight. |
| Ethylene glycol | 2 | Good. |
| Pentaerthyritol | 2 | Very good. |
| D-sorbitol | 2 | Good. |
| D-mannitol | 2 | Do. |
| α-Methyl-D-glucoside | 2 | Do. |
| Butanediol | 2 | Excellent. |
| Carbowax 200 | 2 | Very good. |
| Carbowax 600 | 2 | Good. |
| Dipropylene glycol | 2 | Very good. |
| Triethylene glycol | 2 | Excellent. |
| Polypropylene glycol 425 | 2 | Very good. |
| α-Methyl-D-mannoside | 2 | Do. |
| Diethyl ether of ethylene glycol | 1 | Excellent. |
| Butyl ether of diethylene glycol | 1 | Very good. |
| Diethyl ether of diethylene glycol | 2 | Excellent. |
| Methyl ether of ethylene glycol | 2 | Very good. |
| Butyl ether of ethylene glycol | 2 | Do. |

It should be noted in the above tabulated results that the control spray solution which contained only the iron source and no polyol or polyol ether gave only very slight correction of the chlorosis. On the other hand, all the spray solutions which contained a polyol or polyol ether in conjunction with the organic iron source yielded good to excellent chlorosis correction.

EXAMPLE X

Two liquid concentrates were prepared in drum quantities by mixing Iron Source A (prepared as described in Example I) with an aqueous solution containing glycerol, a commercial spreader ("Vatsol OT"), a commercial sticker ("Plyac"), and low biuret urea was added to one of the concentrates. The quantities of each constituent that was included in the two concentrates (termed concentrates numbers 1 and 2) are indicated in the following table:

| | Weight (kg.) | | | | |
| --- | --- | --- | --- | --- | --- |
| Concentrate No. | Iron Source A (6.5% moisture) | 96% glycerol | Urea | Vatsol OT (75% solution) | Plyac | Water |
| 1 | 61.3 | 99.5 | None | 2.63 | 3.96 | 74.6 |
| 2 | 33.4 | 27.3 | 16.27 | 1.42 | 2.18 | 41.0 |

Concentrates Nos. 1 and 2 were used in amounts of 23 gallons and 21 gallons respectively to form two 600 gallon batches of diluted spray termed Spray No. 1 and Spray No. 2 and having the composition indicated below:

| Spray No. | Concen. No. | Dilution factor (gal. concen./600 gal. spray) | Spray composition | | | | |
| --- | --- | --- | --- | --- | --- | --- | --- |
| | | | Iron (lb./100 gal.) | Glycerol (percent by wt.) | Urea (lb./100 gal.) | Vatsol OT (percent by wt.) | Plyac (percent by wt.) |
| 1 | 1 | 23 | 1.06 | 1.9 | | 0.040 | 0.080 |
| 2 | 2 | 21 | 1.06 | 1.0 | 5.0 | 0.040 | 0.080 |

Spray Nos. 1 and 2 were each applied at the rate of about 200 gallons per acre to approximately three acres each of chlorotic 3 year old navel orange trees (on trifoliate orange rootstock in calcareous soil) in an orchard in central California in late spring while there was still active growth. When observed two weeks later, it was found that chlorosis had been substantially corrected in both three acre plots without damage to foliage or young fruit.

EXAMPLE XI

Fourteen pounds of ground quebracho extract (containing 14.2% moisture) was mixed with 753.5 gm. technical grade $Na_2S_2O_5$ (having an $SO_2$ content of 65.0% by weight), 330.5 gm. reagent grade $Na_2SO_3$ (having an $SO_2$ content of 49.4% by weight) and 103.6 lb. water. The mixture was heated to 125° C. in 13 minutes, digested at 125° C. for 60 minutes and cooled to 21° C. The digested liquor was clarified by screening through a 325-mesh screen. The clarified liquor contained 12.1% solids and 5.1% residual chemical (expressed as $SO_2$, on a dry basis). This liquor was concentrated under vacuum to 48.7% solids in a forced circulation evaporator. The reaction product in this liquor contained, on a solid basis, 2.56% organically combined sulfur (as S) and 2.1% unreacted sulfite (as S). A 410-gram quantity of the concentrated liquor was diluted with 68 gm. water and heated to 190° F. Over a 60-minute period, 159 gm. technical grade $FeSO_4·7H_2O$ was added to the hot liquor. The resulting solution was retained 30 minutes at 65° C. with continuous agitation and was then spray dried to give a quebracho extract iron source.

Four foliar spray compositions were prepared by mixing this quebracho extract iron source with a polyol, low biuret urea, a commercial spreader ("Vatsol OT") and a commercial sticker ("Plyac"). These four spray compositions had the following proportion of ingredients:

| Spray No. | Iron (lb./100 gal.) | Glycerol (percent by wt.) | Propylene glycol (percent by wt.) | Urea (lb./100 gal.) | Vatsol OT (percent by wt.) | Plyac (percent by wt.) |
|---|---|---|---|---|---|---|
| 1 | 1.06 | 1.0 | None | 5.00 | 0.04 | 0.08 |
| 2 | 1.06 | None | 1.0 | 5.00 | 0.04 | 0.08 |
| 3 | 2.12 | None | 1.0 | 5.00 | 0.04 | 0.08 |
| 4 | 4.24 | None | 1.0 | 5.00 | 0.04 | 0.08 |

These sprays were then applied to iron chlorotic leaves on a Valencia orange tree being grown in a controlled environment chamber (as described in Example II). After application of sprays to both sides of the leaves the trees were returned to the environment chamber. Two weeks later a leaf representing each spray treatment was removed from the tree, the leaves were washed with water and compared with an unsprayed iron-chlorotic leaf.

The results of this comparison of sprayed and unsprayed leaves showed that good correction of chlorosis was obtained with all of the foliar spray treated leaves. Appreciable and even greening of the sprayed leaves was observed as compared with the interveinal yellow color of the unsprayed chlorotic leaf.

EXAMPLE XII

A sulfomethylated extract of hemlock bark was prepared by mixing 53.8 lb. ground bark (containing 19.6 lb. dry hemlock bark, 2.9 lb. dry hemlock wood and 31.3 lb. moisture) with a solution comprising 717 gm. technical grade $Na_2S_2O_5$ (65.0% $SO_2$), 323 gm. reagent grade $Na_2SO_3$ (48.1% $SO_2$), 822 gm. aqueous formaldehyde solution (35.43% $CH_2O$) and 63.7 lb. cold water. The mixture was heated to 170° for 25 minutes and cooled to 90° C. in 12 minutes. Extract liquor was separated from the fibrous residue by pressing in a hydraulic basket press, and was subsequently clarified by screening through a 325-mesh screen. The clarified liquor contained 7.2% solids, and the yield of solids thus recovered amounted to 44.3% of the dry hemlock bark fed to the digester. The clarified liquor was concentrated under vacuum to 34.5% solids in a forced circulation evaporator. A 578 gram quantity of the concentrated liquor was mixed with 2.5 gm. $NH_4OH$ solution (23.1% $NH_3$) and 3 gm. of a commercial spreader ("Vatsol OT"—75% solution), and heated to 60° C. To the hot solution was added 159 gm. technical grade $FeSO_4 \cdot 7H_2O$. The resulting solution was retained 30 minutes at 60° C. with continuous agitation and was then spray dried to give a ferrous complex of the sulfomethylated extract of hemlock bark.

A liquid concentrate was prepared by dissolving 143.5 gm. of this ferrous complex product (1.4% moisture) in 210 gm. warm water and subsequently mixing this solution with 246.5 gm. 96% glycerol. A foliar spray was then prepared by mixing 22.9 gm. of the liquid concentrate with 14.7 gm. of a commercial spreader ("Vatsol OT"—1.0% solution), 37.6 gm. of a commercial sticker ("Plyac"—1.0% solution) and 394.8 gm. water.

The spray was applied to two chlorotic branches of a navel orange tree in an orchard in central California during a fall flush of growth. Four weeks later, greening of leaves was observed to have occurred on both of the sprayed branches.

EXAMPLE XIII

Three iron complexes of products containing salts of isosaccharinic acids and other lactonizable hydroxy acids were prepared as described below.

A 2800 ml. sample of effluent liquor from hot caustic soda refining of wood pulp which had been concentrated to about 30% was obtained. This effluent liquor sample was treated with 50% sulphuric acid to lower the pH to 4.9 and the dark insoluble material which had formed was removed by filtration. The solids content of the lighter colored filtrate was found to be 30.8% (w./w.). A 2050 ml. portion of this solution (estimated to contain 760 gm. of solids) was treated with 335 g. of ferrous sulphate heptahydrate dissolved in 1 litre of water after which the pH was raised to 7.0 by addition of 3 N sodium hydroxide. The dark solution was then spray dried, and an almost black hygroscopic powder containing 6.73% iron was obtained. This iron complex product is hereinafter termed "Iron Source B."

Concentrated effluent from hot caustic pulp refining as used above was acidified to pH 1.9 using sulphuric acid. Following removal of the acid insoluble material the filtrate was evaporated down to a syrupy salt cake. This was then triturated using n-butanol and the insoluble sodium sulphate was removed. The n-butanol extract was then washed with water to remove the hydroxy acids and lactones. The resulting solution containing hydroxy acids and lactones was then subjected to further purification by passage of the aqueous solution through columns containing a weak anion exchange resin and activated charcoal. This treatment removed almost all of the color bodies. Finally, the water was removed under vacuum and a clear syrup containing approximately 35% of α- and β-isosaccharino-1,4-lactones was obtained. The balance of the material was made up of other lactones whose average molecular weights were approximately 320 or twice their equivalent weights of 160 by saponification.

A 100 g. sample of this syrupy mixture of lactones was dissolved in 100 ml. of water and the lactones saponified with sufficient hot 3 N potassium hydroxide to give a solution whose final pH was 7.0. Then, 4.0 g. of ferrous sulphate heptahydrate dissolved in approximately 120 ml. of water was added to the solution to give a clear dark green solution. This was concentrated under vacuum, to leave a thick syrupy black mass containing 12.8% iron and 98.4% OD solids which is hereinafter termed "Iron Source C."

A 1000 ml. sample of concentrated hot caustic soda wood pulp refining effluent was diluted with 1000 ml. of water and acidified to pH 5.0 using 50% sulphuric acid. The acid insoluble material was then removed by filtration. The filtrate was found to contain 33% solids. A 300 g. sample of this solution was diluted further to 600 ml. and passed through a column containing 750 ml. of a macroreticular ion exchange resin in the potassium ion form (Amberlite IRA-200) over a period of 2 hours. The column was washed with water and the effluent and washings concentrated to 900 ml. Ferrous sulphate heptahydrate (66 g.) dissolved in 200 ml. of water was then added to give a clear solution with a pH of 5.1. This solution was concentrated under vacuum, to leave a dry black solid with iron content of 10.4% which is hereinafter termed "Iron Source D."

Chlorotic leaves of Valencia orange seedlings growing in California calcareous soil were sprayed on both sides with the penetrant iron sprays. The trees were then grown in a controlled environment chamber (described in Example II) for two weeks, resprayed, and grown for two more weeks in the environment chamber. The leaves were then removed, washed and observed. Spray compositions used and the observed results are tabulated in the following table.

| Iron source used in spray | Spray composition | | | Chlorosis correction |
|---|---|---|---|---|
| | Iron content | Polyol | Urea | |
| B | 0.67 lbs./100 gal. | 1% glycerol | 5 lbs. per 100 gal. | Good. |
| C | 2.12 lbs./100 gal. | 2% propylene glycol | 0 | Excellent. |
| D | do | do | 0 | Very good. |

EXAMPLE XIV

A small Eureka lemon tree on a dwarfing rootstock and growing in a 5 gallon can of California calcareous soil was maintained in a controlled environment chamber (described in Example II). The dwarf lemon tree was watered daily with a solution containing one gram per liter of potassium bicarbonate to raise the soil pH. After about nine months, the foliage had become chlorotic, whereupon the tree was allowed to continue growth in this chlorotic condition in the environment chamber and normal watering.

Individual leaves of the lemon tree suffering from iron chlorosis were sprayed with water solutions containing (a) 10 lb. per 100 gallons Iron Source A (containing 10.6% iron) plus 0.01% commercial spreader ("Aerosol OT") and (b) treatment (a) plus 2% glycerol. The lemon tree was then grown in the environment chamber for two weeks, resprayed, and grown for two more weeks. The leaves were then removed, washed and observations made. Whereas no correction was obtained with Iron Source A alone, chlorosis correction was obtained when the foliar spray containing glycerol in conjunction with Iron Souce A was employed.

EXAMPLE XV

A water extract of red cedar (*Thuja plicata*) sawdust was clarified and concentrated in an evaporator to 25% total solids. This concentrated liquor was neutralized to pH 5.5 with potassium hydroxide and then extracted with methyl ethyl ketone in a rotating disc contactor at a solvent to liquor flow rate ratio of 1:1. The raffinate was stripped of methyl ethyl ketone and treated with ferrous sulfate in an amount sufficient to give 10% iron content in the spray dried iron complexed potassium plicatate product.

A foliar spray was prepared by dissolving an amount equivalent to 10 lb. of this spray dried iron complexed potassium plicatate product in 100 gallons of water containing 2% glycerol and 0.01% (based on the weight of the solution) of a commercial spreader ("Aerosol OT"). This resulting solution was sprayed on separate, individual iron chlorotic leaves of a chlorotic orange tree. The tree was then grown in a controlled environment chamber (described in Example II) for two weeks. The leaves were then resprayed and grown for another two weeks in the controlled environment chamber. The leaves were then removed from the tree, washed and the results of the spray applications observed.

It was found that the leaves which were sprayed with the foliar spray containing iron complexed potassium plicatate exhibited excellent correction of iron chlorosis whereas unsprayed leaves were still iron chlorotic.

EXAMPLE XVI

A series of foliar sprays were prepared by incorporating therein 1% propylene glycol, 0.04% commercial spreader ("Aerosol OT") and a ferric complex of an alpha amino acid derived from a polyamine. The amount of ferric complex included in each of the sprays was equivalent to 2.12 lb. iron per 100 gallons of water. The ferric complexes of alpha amino acids employed in the respective sprays were: (1) an iron chelate of ethylenediaminetetraacetate, (2) an iron chelate of diethylenetriaminepentaacetate, and (3) an iron chelate of ethylenediamine di[orthohydroxy phenylacetate].

The various foliar spray solutions were sprayed on separate, individual iron chlorotic leaves of a chlorotic orange tree. The tree was then grown in a controlled environment chamber (described in Example II) for two weeks. The leaves were then resprayed and the tree grown for another two weeks in the controlled environment chamber. After this second growth period, the sprayed leaves were removed from the tree, washed and rated as to correction of iron chlorosis. The results are shown in the following table:

| Foliar spray No. | Iron source (ferric complex of an alpha amino acid derived from a polyamine) | Rated correction of iron chlorosis |
|---|---|---|
| 1 | None | No correction (leaf chlorotic). |
| 2 | Iron chelate of ethylenediaminetetraacetate. | Good correction. |
| 3 | Iron chelate of diethylenetriaminepentaacetate. | Do. |
| 4 | Iron chelate of ethylenediamine di[orthohydroxy penylacetate]. | Fair correction. |

EXAMPLE XVII

A supply of eucalyptus bark (*Eucalyptus globulus*), a hardwood bark, was processed under conditions essentially the same as set forth in Example I. The resulting iron complexed, dried hardwood bark product had an iron content of 11.2% (on a dry basis).

A foliar spray was then prepared by dissolving an amount equivalent to 20 lb. of this iron complexed, dried product in 100 gallons of water containing 1% propylene glycol and 0.04% of a commercial spreader ("Aerosol OT") by weight. The resulting solution was sprayed on separate, individual iron chlorotic leaves of a chlorotic orange tree. The tree was then grown in a controlled environment chamber (described in Example II) for two weeks. The tree was then resprayed and grown for another two weeks in the controlled environment chamber. After this second growth period, the sprayed leaves were removed from the tree, washed and observed.

The results of this testing showed that good correction of chlorosis was obtained with the leaves sprayed with the foliar spray prepared from the iron complexed eucalyptus bark, whereas the unsprayed leaves were still chlorotic.

While the principles of the invention have been described in conjunction with specific products and applications, it is to be understood that this description is made only by way of example and not as a limitation on the scope of the invention.

We claim:

1. Foliar sprays for treating iron chlorotic tropical and sub-tropical evergreen fruit trees, said sprays eliminating the iron deficiency of said trees by penetrating through the waxy surface of the leaves of said trees allowing the iron in said spray to permeate throughout the iron deficient area of said leaves, comprising: aqueous solutions of penetrant compounds selected from the group consisting of non-toxic, water miscible, aliphatic polyhydric alcohols containing from 2 to 28 carbon atoms, low alkyl ethers of said polyhydric alcohols wherein said alkyl group contains from 1 to 4 carbon atoms and mixtures thereof, and organic plant-available iron sources selected from the group consisting of ferrous complexes of sulfonated polymeric flavonoids, ferrous complexes of sulfomethylated polymeric flavonoids derived from conifer barks, iron complexes of potassium and sodium plicatates, ferrous and ferric salts of hydroxy acids, ferrous complexes of hydroxy acid salts, and ferric complexes of alpha amino acids derived from polyamines and mixtures thereof; said penetrant compounds being present in said aqueous solution in an amount of from about 0.3% to about 8% (based on the weight of the solution) and said organic iron sources being present in said aqueous solution in an amount of from about 0.5 to about 6.0 pounds of iron per 100 gallons of solution.

2. The foliar sprays of claim 1 wherein said penetrant compounds are selected from the group consisting of glycerol, propylene glycol, 1,3-butanediol, ethyl ether of ethylene glycol, diethyl ether of ethylene glycol and mixtures thereof and said iron sources are selected from the group consisting of ferrous complexes of sulfonated polymeric flavonoids derived from quebracho wood, ferrous complexes of sulfonated polymeric flavonoids derived from hemlock bark, ferrous complexes of sulfonated polymeric flavonoids derived from eucalyptus bark, ferric and ferrous salts of and ferrous complexes of sodium, potassium, ammonium and sodium-potassium salts of gluconic acid, glucoheptonic acid, gulonic acid and idonic acid, citric acid, tartaric acid, mannoheptonic acid, isosaccharinic and saccharinic acids, mannoheptonic acid, isosaccharinic and saccharinic acids, ferric complexes of alpha amino acids derived from ethylenediaminetetraacetic acid, ferric complexes of alpha amino acids derived from diethylenetriaminepentaacetic acid, ferric complexes of alpha amino acids derived from ethylenediamine di[o-hydroxyphenylacetic acid] and mixtures thereof.

3. Foliar sprays for overcoming iron deficiency in iron chlorotic tropical and sub-tropical evergreen trees,
said sprays eliminating the iron deficiency of said trees by penetrating through the waxy surface of the leaves of said trees allowing the iron in said spray to permeate throughout the iron deficient area of said leaves, comprising aqueous solutions of penetrant compounds selected from the group consisting of non-toxic, water soluble aliphatic polyhydric alcohols containing from 2 to 28 carbon atoms,
low alkyl ethers of said polyhydric alcohols wherein said alkyl group contains from 1 to 4 carbon atoms and mixtures thereof, and
organic plant-available iron sources.

4. The foliar sprays of claim 3 wherein a minor amount of a sticker is included therein.

5. The foliar sprays of claim 3 wherein said polyols are selected from the group consisting of glycerol, ethylene glycol, propylene glycol, dipropylene glycol, triethylene glycol, 1,3-butanediol, polypropylene glycol with an average molecular weight of about 425, pentaerythritol, sorbitol, mannitol, α-methyl-D-glucoside, α-methyl-D-mannoside, polyethylene glycols with up to 28 carbon atoms, and mixtures thereof.

6. The foliar sprays of claim 3 wherein a minor amount of a spreader is included therein.

7. The foliar sprays of claim 3 wherein said low alkyl ethers are selected from the group consisting of low mono- and di-alkyl ethers of ethylene glycol, dimethyl ethers of di-, tri-, and polyethylene glycols and mixtures thereof.

8. The foliar sprays of claim 3 wherein said iron sources are selected from the group consisting of ferrous complexes of sulfonated polymeric flavonoids, ferrous complexes of sulfomethylated polymeric flavonoids derived from conifer barks, ferrous and ferric salts of hydroxy acids, ferrous complexes of hydroxy acid salts, and mixtures thereof.

9. The foliar sprays of claim 8 wherein said ferrous complexes of sulfonated polymeric flavonoids are derived from conifer barks, hardwood barks and quebracho wood.

10. The foliar sprays of claim 9 wherein said conifer barks are hemlock barks.

11. The foliar sprays of claim 9 wherein said conifer barks are southern pine barks.

12. The foliar sprays of claim 8 wherein said sulfomethylated polymeric flavonoids derived from conifer barks are derived from hemlock barks.

13. The foliar sprays of claim 8 wherein said ferrous and ferric salts of hydroxy acids and said ferrous complexes of hydroxy acid salts are salts of hydroxy acids selected from the group consisting of gluconic acid, glucoheptonic acid, mixed gulonic and idonic acids, glucosaccharic acid, tartaric acid, citric acid, mannoheptonic acid, isosaccharinic acid, saccharinic acid and mixtures thereof.

14. The foliar sprays of claim 3 wherein said non-toxic, water soluble compounds selected from the group consisting of polyols, ethers of said polyols and mixtures thereof are present in an amount of from about 0.3% to about 8% (based on the weight of the spray solution) and said organic iron sources are present in an amount sufficient to provide concentrations of from about 0.5 to about 6.0 pounds of iron per 100 gallons of spray solution.

15. The foliar sprays of claim 3 including low-biuret urea.

16. The foliar sprays of claim 15 wherein said urea is present in an amount of from about 2.5 to about 10 pounds per 100 gallons of spray solution.

17. The foliar sprays of claim 6 wherein said spreader is sodium dioctyl sulfosuccinate.

18. A method of overcoming iron deficiency in iron chlorotic tropical and sub-tropical evergreen fruit trees comprising: preparing an aqueous foliar spray composition, said foliar spray composition including a non-toxic, water soluble compound selected from the group consisting of polyols, low alkyl ethers of said polyols and mixtures thereof, and an organic iron source; and spraying the surface of said chlorotic trees with said spray composition, said spray composition penetrating through the waxy cuticles of the leaves of said chlorotic trees to effectively control said iron deficiency and to promote translocation of iron within said leaves causing more even and complete greening of said leaves.

19. The method of claim 18 wherein said iron chlorotic evergreen fruit trees are selected from the group consisting of citrus trees, avocado trees, and coffee bean trees.

20. The method of claim 19 wherein said citrus trees are selected from the group consisting of orange trees and lemon trees.

21. The method of claim 18 wherein the foliar spray is prepared by formulating said spray as a liquid concentrate comprising a 40–50% aqueous solution of said organic iron source, adding to said liquid concentrate an amount of said non-toxic, water soluble compound selected from the group consisting of polyols, low alkyl ethers of said polyols and mixtures thereof and diluting said liquid concentrate to a desired concentration for spraying.

22. The method of claim 18 wherein said polyols are aliphatic polyhydric alcohols containing from 2 to 28 carbon atoms.

23. The method of claim 22 wherein said polyols are selected from the group consisting of glycerol, ethylene glycol, propylene glycol, dipropylene glycol, triethylene glycol, 1,3-butanediol, polypropylene glycol with an average molecular weight of about 425, pentaerythritol, sorbitol, mannitol, α-methyl-D-glucoside, α-methyl-D-mannoside, polyethylene glycols with up to 28 carbon atoms, and mixtures thereof.

24. The method of claim 22 wherein said ethers are low alkyl ethers of said polyhydric alcohols and wherein the alkyl group has 1 to 4 carbon atoms.

25. The method of claim 24 wherein said low alkyl ethers are selected from the group consisting of low mono- and di-alkyl ethers of ethylene glycol, dimethyl ethers of di-, tri-, and polyethylene glycols and mixtures thereof.

26. The method of claim 18 wherein said iron sources are selected from the group consisting of ferrous complexes of sulfonated polymeric flavonoids, ferrous complexes of sulfomethylated polymeric flavonoids derived from conifer barks, ferrous and ferric salts of hydroxy acids, ferrous complexes of hydroxy acid salts, and mixtures thereof.

27. The method of claim 25 wherein said ferrous complexes of sulfonated polymeric flavonoids are derived from conifer barks, hardwood barks and quebracho wood.

28. The method of claim 27 wherein said conifer barks are hemlock barks.

29. The method of claim 27 wherein said conifer barks are southern pine barks.

30. The method of claim 26 wherein said sulfomethylated polymeric flavonoids derived from conifer barks are derived from hemlock barks.

31. The method of claim 26 wherein said ferrous and ferric salts of hydroxy acids and said ferrous complexes of hydroxy acid salts are salts of hydroxy acids selected from the group consisting of gluconic acid, glucoheptonic acid, mixed gulonic and idonic acids, glucosaccharic acid, tartaric acid, citric acid, mannoheptonic acid, isosaccharinic acid, saccharinic acid and mixtures thereof.

32. The method of claim 18 wherein said non-toxic, water soluble compounds selected from the group consisting of polyols, ethers of said polyols and mixtures thereof are present in an amount of from about 0.3% to about 8% (based on the weight of the spray solution) and said organic iron sources are present in an amount sufficient to provide concentrations of from about 0.5 to 6.0 pounds of iron per 100 gallons of spray solution.

33. The method of claim 18 wherein said foliar spray composition includes low-biuret urea.

34. The method of claim 33 wherein said urea is present in said spray composition in an amount of from about 2.5 to about 10 pounds per 100 gallons of spray solution.

35. The method of claim 18 wherein said foliar spray composition includes a minor amount of a spreader.

36. The method of claim 35 wherein said spreader is sodium dioctyl sulfosuccinate.

37. The method of claim 18 wherein said spray composition includes a minor amount of a sticker.

References Cited

UNITED STATES PATENTS

| | | | |
|---|---|---|---|
| 2,720,726 | 10/1955 | Ferguson | 71—1 X |
| 2,867,944 | 1/1959 | Fletcher | 71—1 X |
| 2,951,753 | 9/1960 | Groves | 71—1 |
| 3,131,048 | 4/1964 | Balassa | 71—1 |
| 3,140,938 | 7/1964 | Martin et al. | 71—1 |
| 3,270,003 | 9/1966 | Blaricom et al. | 71—1 X |
| 3,365,287 | 1/1968 | Zaehner | 71—1 |
| 3,404,068 | 10/1968 | Batistoni | 71—1 X |
| 3,473,255 | 10/1969 | Working | 71—1 X |
| 2,663,629 | 12/1953 | Semon | 71—30 |
| 2,869,998 | 1/1959 | Vierling | 71—1 X |

SAMIH N. ZAHARNA, Primary Examiner

R. BARNES, Assistant Examiner

U.S. Cl. X.R.

71—27